United States Patent [19]
Wyatt

[11] 3,761,929
[45] Sept. 25, 1973

[54] RADAR SPOOF
[75] Inventor: Theodore Wyatt, Silver Spring, Md.
[73] Assignee: The United States of America as represented by the Secretary of the Navy, Washington, D.C.
[22] Filed: Feb. 24, 1971
[21] Appl. No.: 118,539

[52] U.S. Cl............... 343/18 B, 149/87, 244/136, 343/18 E
[51] Int. Cl. ..................................... G01s
[58] Field of Search...................... 149/87; 244/136; 343/18 R, 18 B, 18 E

[56] References Cited
UNITED STATES PATENTS
2,871,344  1/1959  Busignies........................... 343/18 B
3,150,848  9/1964  Lager................................. 343/18 E
3,518,670  6/1970  Miller................................ 343/18 E
2,986,456  5/1961  Toulmin............................. 149/87
3,122,429  2/1964  Toulmin............................. 149/87

Primary Examiner—Stephen C. Bentley
Attorney—R. S. Sciascia, J. A. Cooke and R. J. Erickson

[57] ABSTRACT

A method and preferred means for utilizing a heat thrust engine exhaust to ignite and distribute a combustible mixture rich in ionizable material, thereby producing an engine exhaust capable of confusing radar or infrared tracking systems. More particularly, a slurry typically composed of a hydrocarbon fuel and an ionizable substance is injected into the tailpipe section of an aircraft to produce an engine exhaust having a radar and infrared return greater than that of the aircraft, thereby decoying the unfriendly detection or tracking system away from the aircraft and allowing the aircraft to undertake evasive action to avoid the weaponry associated with the detection or tracking system.

4 Claims, 6 Drawing Figures

Patented Sept. 25, 1973

INVENTOR.
THEODORE WYATT
BY
J. A. Cooke
ATTORNEY

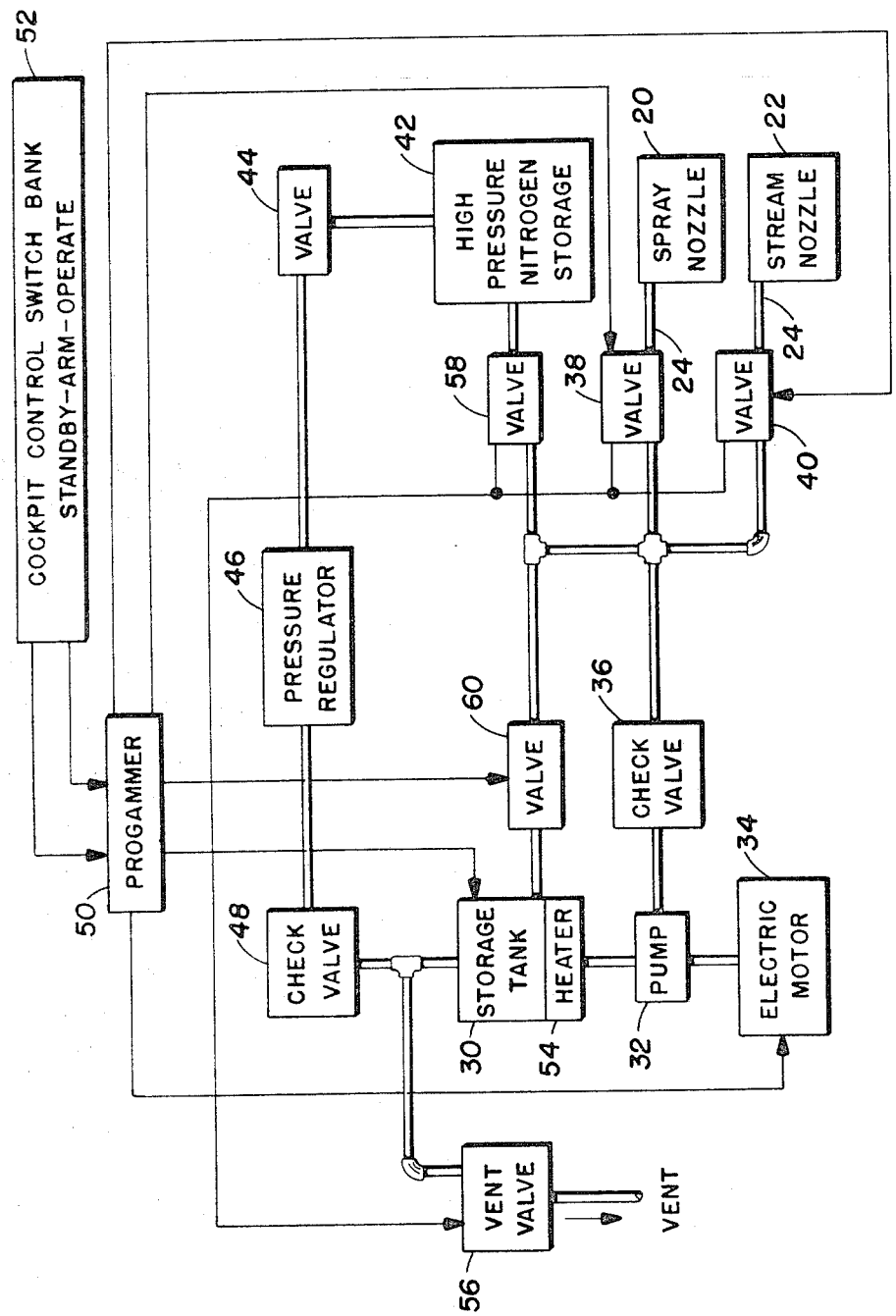

RADAR SPOOF

BACKGROUND AND SUMMARY OF THE INVENTION

Radar reflective devices have long been used to enable a combat pilot to evade detection and tracking by a defensive radar. Usually, these prior devices have taken the form of "chaff" released into the air stream or "corner-type" reflectors ejected from the aircraft. Radar "decoys" of this type are intended to produce a radar return greater than that produced by the aircraft itself. However, due to the deployment and/or erection delays incident to the use of these "mechanical" devices, the desired radar return may not be produced until the aircraft has advanced beyond the effective radius of the decoy. Thus, a "locked-in" homing radar unit may not be decoyed due to the wide separation of the decoy signal from the return produced by the aircraft.

Although electronic chaff generation schemes provide a partial solution to the delay problem, the apparatus required is generally bulky and expensive. Both mechanical and electrical decoy means share a second serious shortcoming, i.e., infrared sensing systems are not substantially deterred by their use.

Accordingly, the present invention provides a method and means for producing a large signal radar return immediately aft of an aircraft to decoy both radar and infrared tracking means. Essentially, the high temperature exhaust of the aircraft is used both as the ignition source and distribution means for a combustible mixture rich in ionizable material. For example, a slurry composed of a hydrocarbon fuel and a substance having a low ionization potential injected into the tailpipe section of the aircraft produces an engine exhaust having a temporarily large radar return, thus providing a signal return greater than that of the aircraft and tending to draw a tracking radar aft of the aircraft. The pilot, on discontinuance of the slurry flow, commences evasion maneuvers to avoid detection and/or intercept. The exhaust thus produced is also capable of decoying infrared homing systems.

The method of the invention can be advantageously utilized to cause a fully intense radar return immediately aft of the aircraft, in contrast to the spatial separation of window due to chaff bloom delay time, or can be caused to produce a false return which smoothly increases separation from the aircraft. The false return created according to the invention exhibits the same velocity and direction as the ejecting vehicle while possessing frequency diversity for as long as the electron density of the engine exhaust is greater than the critical value for the highest desired frequency. Progressive decay of the electron density results in a sequential reduction of the frequency diversification.

Accordingly, it is a primary object of the invention to provide a method and means for producing a detection and tracking countermeasure which prevents radar and infrared homing on the aricraft.

Another object of the invention is to provide a method and means for igniting and distributing a combustible mixture rich in ionizable material to produce a substantial radar return aft of an aircraft.

A further object of the invention is to provide a method and means for utilizing the engine exhaust of an aircraft to ignite and distribute a combustible mixture rich in ionizable material, thereby producing an exhaust having an electron density of sufficient magnitude to cause a substantial radar return aft of the aircraft.

BRIEF DESCRIPTION OF THE DRAWINGS

FIG. 3 is a schematic illustrating a control and distribution system for injecting the combustible mixture into the engine exhaust of an aircraft.

DESCRIPTION OF THE PREFERRED EMBODIMENT

Figure 1A:
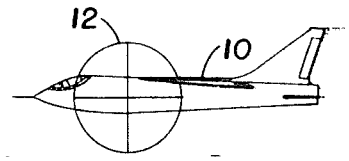
FIGS. 1a, 1b and 1c are perspectives which schematically depict a tactical situation wherein, in sequence, a tracking radar detects an aircraft, the tracking radar is decoyed to an engine exhaust emitted from the aircraft and which has a substantial radar return, and the aircraft commences evasive action after the tracking radar "locks-in" on the false radar signal.

The utility of the present invention is best appreciated from a description of a tactical situation in which the invention would normally be employed. In FIG. 1a, a typical turbojet aircraft 10 is shown immediately after detection by a tracking radar (not shown), the circle with crosshairs 12 being shown to visibly illustrate the area of track of the radar. Well-known apparatus aboard the aircraft 10 advises the pilot of the radar threat. In the event that a missile is subsequently launched along the azimuth provided by the tracking radar, the pilot detecting the launch will then commence procedures to be described. However, the invention may also be useful to decoy other defensive weapons systems utilizing tracking radar and which respond immediately after detection of the aircraft 10. In this event, the pilot would initiate the procedures to be described immediately after detection of the radar threat.

Figure 1B:
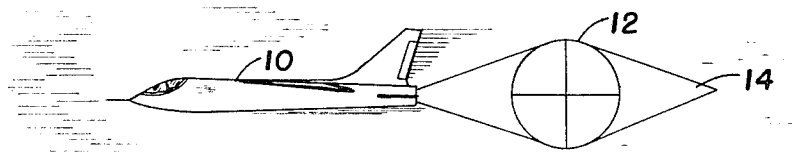

At the proper time, the pilot discharges a combustible mixture rich in ionizable material either into the engine tailpipe or into the hot exhaust exiting the tailpipe. The extreme conditions present in either location produces a high electron density in the exhaust, thus causing the exhaust to display a radar cross-section greater than that radar signature produced by the aircraft 10. Thus, as illustrated in FIG. 1b, tracking shifts from the aircraft 10 to the exhaust, shown at 14.

Figure 1C:
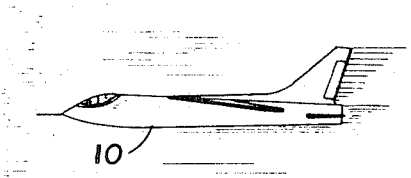

In FIG. 1c, the pilot has discontinued the flow of the combustible mixture into the exhaust 14. Principal combustion of the combustible mixture may be delayed until the mixture is well aft of the aircraft 10. Thus, with a missile 16 tracking the exhaust 14, the aircraft 10 is free to proceed beyond the lethal radius of the missle warhead. Although a number of procedural variations may be used, depending on the tactical situation and/or on the composition of the combustible mixture, the principal objective of the present method is to cause temporarily a large radar return aft of the aircraft 10 in order to decoy a tracking radar from the aircraft.

Figure 2A:
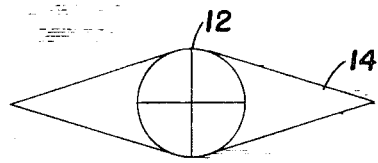
FIG. 2a is an elevation, partly in section, of the aft section of an aircraft having a portion of said section cut away to reveal means for injecting a combustible slurry into the engine exhaust of the aircraft.
Figure 2A:
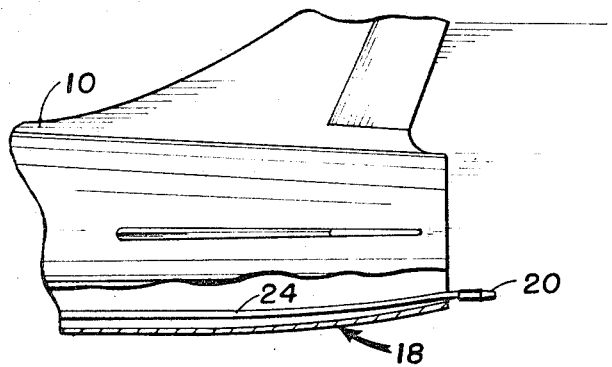
Figure 2B:
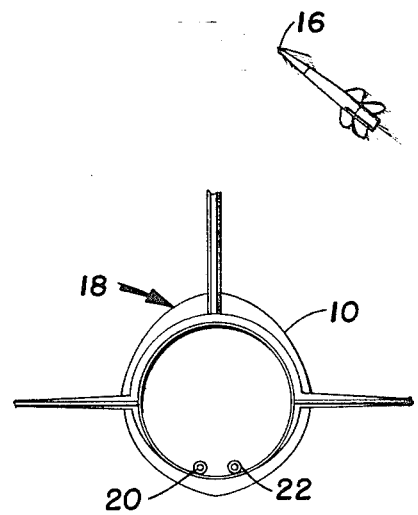
FIG. 2b is an end view looking toward the aft end of the aircraft.

As can be seen from the tactical situation described, the aircraft engine exhaust is utilized as the ignition and distribution mechanism for the electron-producing combustible mixture, the several compositions of which will be described hereinafter. The combustible mixture may either be injected into the tailpipe section of the aircraft 10 or be directed into the exhaust after said exhaust has exited the aircraft. FIGS. 2a and 2b show the aft section 18 of the aircraft 10, which aricraft has been fitted with dual nozzles 20 and 22 and pipe lines 24 for directing the combustible mixture into the exhaust emanating from the aircraft 10. The nozzle arrangement shown in FIGS. 2a and 2b minimizes modification to the airframe and engine of the aircraft 10 and readily integrates with the supply and control apparatus of FIG. 3 to carry out the present method.

The nozzle 20 may be utilized to produce a spray discharge into the engine exhaust, while the nozzle 22 is designed to produce a stream discharge. Since the spray discharge ignites and burns more rapidly than the stream discharge, a substantial radar return may be produced immediately aft of the aircraft 10 by use of the nozzle 20, while the nozzle 22 may be used to cause a substantial radar return further aft of the aircraft. Thus, the nozzles 20 and 22, in combination with particular compositions of the combustible mixture to be described hereinafter, may be used singly or in concert to produce varying decoy patterns suited to particular tactical situations. The nozzles 20 and 22 may be provided with spring-loaded relief valves, mentioned hereinafter, disposed in the pipelines 24 and in proximity to the nozzles in order to prevent spilling of residual combustible mixture usually remaining in said pipe lines 24 and producing an undesired radar return.

The nozzles 20 and 22 comprise a portion of the simplified mechanical/electrical supply and control system shown diagrammatically in FIG. 3. The combustible mixture is stored and maintained at a desired temperature in a storage tank 30. The mixture is transferred from the tank 30 by a pump 32 which is driven by motor 34. The mixture must pass through a check valve 36 prior to access to spring-loaded relief valves 38 and 40 serving the nozzles 20 and 22. Pump cavitation is prevented by pressurization of the tank 30, accomplished through the use of a high pressure nitrogen storage cylinder 42 operating through a control valve 44, pressure regulator 46, and check valve 48.

The system of FIG. 3 is controlled by a programmer 50 which is manually operated by the pilot of the aircraft 10 through a cockpit control switch bank 52. After aircraft take-off, the "standby" switch position is selected, the programmer 50 thereby causing a thermostatically-controlled heater 54 in the tank 30 to maintain the combustible mixture therein at a temperature sufficiently high to prevent said mixture from becoming too viscous to flow in the pipe network of the system. When the tactical situation warrants, the "arm" switch position of the switch bank 52 is selected, the programmer 50 thereby opening valve 44 to pressurize the tank 30. Temperature control in the tank 30 is maintained by the thermostatically-controlled heater 54.

In the event of attack on the aircraft 10, the momentary contact "operate" switch position of the bank 52 is selected, when the programmer 50 will initiate a predetermined timing cycle for starting the electric motor 34 and either open the valve 38 to release a spray through the nozzle 20, open the valve 40 to release a stream through the nozzle 22, or produce a sequential combination of these two operations. The cycle can be repeated until exhaustion of the combustible mixture by resetting to the "operate" switch position on the switch bank 52. On completion of the mission the system is evacuated by depressurizing the tank 30 through a vent valve 56, by opening a valve 58 connected to the storage cylinder 42, and by purging the valves 38 and 40.

Although typical combustible mixtures useful to the invention exhibit little tendency to settle out from their usual "slurry" phases, the programmer 50 may periodically operate the pump motor 34 and a valve 60 after selection of either the "standby" or "arm" switch positions on the bank 52, with an interlock (not shown) being provided to prevent such operation when the switch on the bank 52 has been moved to operate.

The combustible mixture mentioned above usually constitutes a slurry comprised of a hydrocarbon fuel component and an ionizable substance such as powdered aluminum or a cesium compound. The hydrocarbon fuel component is provided largely as the slurry medium, although the heat of combustion of the fuel component may be useful to promote the thermal ionization of the ionizable substance.

Although several electropositive elements have low ionization potentials, cesium and rubidium have the lowest ionization potentials of the elements. These elements also have boiling points sufficiently low (about 690°C) such that the vapor phase is present under turbojet tail pipe conditions. Thus, these elements may be provided for dissociation as individual atoms without prior combustion.

Due to the difficulty of handling cesium in its elemental form, a preferred composition of the combustible mixture contains cesium as the alkali constituent of a "soap", e.g., a stearate, palmitate, or oleate. Other organo-metallic compounds, other than those containing electronegative species such as halides, which tend to suppress free electron production, may be found to be useful. Use of a cesium soap tends to increase the viscosity of the mixture thereby reducing the burning rate thereof which results in increasing the length of the exhaust flame and causing a signal-producing exhaust further aft of the aircraft. Time delay may alternately be accomplished by the addition of white phophorus granules into the mixture. Thus, when the hydrocarbon fuel evaporates or burns from the surfaces of the granules, the granules ignite spontaneously to increase the thermal level in the far exhaust, thereby aiding combustion of the electron-producing substance at a distance from the aircraft.

A preferred composition combines the properties of several electropositive materials. Powdered magnesium and powdered aluminum may be added to the composition as fuel components. Since aluminum has the better weight and volume fuel specific, a hotter burning mixture is obtained by a larger proportion of aluminum to magnesium. However, magnesium has a lower ignition temperature in air (500°-600°C vs. 600°-700°C) and acts to ensure more complete combustion of the mixture. Moreover, magnesium produces greater amounts of visible and ultraviolet light, thereby causing photoelectric ionization of the ionizable component. Thorium and cerium may conveniently be added to increase photoelectric ionization in the exhaust.

A typical combustible mixture combining most of the previously mentioned substances and which is generally compatible with known tactical requirements comprises (by weight):

1. powdered aluminum 30 percent
2. powdered magnesium 10 percent
3. cesium soap 5 percent
4. gasoline (unleaded) 55 percent, and,
5. thorium and cerium in trace amounts The most desirable property of the combustible mixture is the production thereof of a large electron density in the exhaust, the electrons having a substantial lifetime. A means electron lifetime of 0.6 seconds coupled with a flight velocity greater than 1000 feet per second provides an acceptable decoy against known defensive weaponry considering initiation of ionization in the exhaust immediately aft of the aircraft. The lifetime of the electrons before recombination occurs is a function of altitude, being greater for higher altitudes. Observation of substantial radar return from ionized cesium for one second at altitudes in the range of 100,000 to 200,000 feet has been made. Consequently, the invention will find principal utility at altitudes above 100,000 feet, which altitude range is now coming into use by certain special aircraft.

I claim:

1. A method for producing a false radar return initially in the vicinity of an aircraft which produces a high temperature exhaust and subsequently a distance from said aircraft, comprising the steps of
    spraying a first combustible mixture including a first combustible fuel component and a first ionizable material into the exhaust,
    discontinuing the spraying of said first combustible mixture into said exhaust,
    and injecting in the form of a continuous stream a second combustible mixture comprising a second combustible fuel component and a second ionizable material into the exhaust subsequently to the exit of said exhaust from the aircraft.

2. The method of claim 1 wherein said first and second combustible mixtures comprise slurries consisting of (by weight):
    a. powdered aluminum 30 percent
    b. powdered magnesium 10 percent
    c. gasoline (unleaded) 55 percent
    d. cesium soap selected from the group consisting of cesium stearate, cesium oleate, or cesium palmitate 5 percent and
    e. thorium and cerium in trace amounts.

3. A method for producing an electron population in a high-temperature gaseous exhaust from an engine, the electron population being of sufficient density and duration to reflect a radar signal, the method comprising the step of injecting a combustible mixture into the exhaust after said exhaust is emitted from the engine, the combustible mixture comprising a slurry consisting of (by weight):
    a. powdered aluminum 30 percent
    b. powdered magnesium 10 percent
    c. gasoline (unleaded) 55 percent
    d. cesium soap selected from the group consisting of cesium oleate or cesium palmitate 5 percent and,
    e. thorium and cerium in trace amounts.

4. In an aircraft which expels a high-temperature gaseous exhaust, means for producing and distributing a radar reflective exhaust therefrom, comprising,
    a combustible slurry consisting of (by weight):
        a. powdered aluminum 30%
        b. powdered magnesium 10%
        c. gasoline (unleaded) 55%
        d. cesium soap selected from the group consisting of cesium oleate or cesium palmitate 5% and,
        e. thorium and cerium in trace amounts;
    nozzle means for injecting said slurry into the exhaust;
    thermostatically controlled storage means for holding and heating said mixture prior to injection of the slurry into the exhaust;
    pressurized means for maintaining pressure in said storage means; and
    control means for controlling the amount of the combustible slurry to be injected into the exhaust.

* * * * *